(12) United States Patent
Koelewijn et al.

(10) Patent No.: US 11,912,937 B2
(45) Date of Patent: Feb. 27, 2024

(54) ACIDIZING TREATMENT FLUID FOR DELAYED ACIDIFICATION IN THE OIL FIELD INDUSTRY

(71) Applicant: NOURYON CHEMICALS INTERNATIONAL B.V., Amsterdam (NL)

(72) Inventors: Willem Koelewijn, Deventer (NL); Maria Antonieta Leon Matheus, Epse (NL); Cornelis Kooijman, Deventer (NL); Cornelis Elizabeth Johannus Van Lare, Wijchen (NL)

(73) Assignee: NOURYON CHEMICALS INTERNATIONAL B.V., Amsterdam (NL)

( * ) Notice: Subject to any disclaimer, the term of this patent is extended or adjusted under 35 U.S.C. 154(b) by 0 days.

(21) Appl. No.: 17/999,238

(22) PCT Filed: May 19, 2021

(86) PCT No.: PCT/EP2021/063291
§ 371 (c)(1),
(2) Date: Nov. 18, 2022

(87) PCT Pub. No.: WO2021/233999
PCT Pub. Date: Nov. 25, 2021

(65) Prior Publication Data
US 2023/0220271 A1 Jul. 13, 2023

(30) Foreign Application Priority Data

May 20, 2020 (EP) .................................... 20175675
May 20, 2020 (EP) .................................... 20175679
Jun. 23, 2020 (EP) .................................... 20181769

(51) Int. Cl.
*C09K 8/74* (2006.01)
*E21B 43/27* (2006.01)
*C09K 8/524* (2006.01)

(52) U.S. Cl.
CPC ................ *C09K 8/74* (2013.01); *C09K 8/524* (2013.01); *E21B 43/27* (2020.05)

(58) Field of Classification Search
CPC .. C09K 8/74; C09K 8/54; E21B 43/27; E21B 36/23
See application file for complete search history.

(56) References Cited

U.S. PATENT DOCUMENTS

| | | | |
|---|---|---|---|
| 2,301,875 A | 11/1942 | Holmes | |
| 3,885,630 A | 5/1975 | Richardson | |
| 3,889,753 A | 6/1975 | Richardson | |
| 4,122,896 A | 10/1978 | Scheuerman et al. | |
| 7,060,661 B2 | 6/2006 | Dobson et al. | |
| 2004/0152601 A1* | 8/2004 | Still | C09K 8/03 507/100 |
| 2005/0016731 A1* | 1/2005 | Rae | C09K 8/72 507/260 |
| 2006/0194700 A1* | 8/2006 | Gatlin | C23F 11/10 507/140 |
| 2009/0042748 A1* | 2/2009 | Fuller | C09K 8/78 507/260 |
| 2016/0265316 A1* | 9/2016 | Reyes | C09K 8/54 |

FOREIGN PATENT DOCUMENTS

| | | |
|---|---|---|
| CN | 105018061 A | 11/2015 |
| GB | 1258068 A | 12/1971 |
| RU | 2311439 C2 | 11/2007 |
| RU | 2447125 C1 | 4/2012 |
| WO | 2009016549 A2 | 2/2009 |
| WO | 2014150499 A1 | 9/2014 |
| WO | 2014209649 A1 | 12/2014 |
| WO | 2016053283 A1 | 4/2016 |
| WO | 2020002011 A1 | 1/2020 |

OTHER PUBLICATIONS

Abrams A. et al., "Higher-pH acid Stimulation Systems", Journal of Petroleum Technology, Society of Petroleum Engineers, US, vol. 35, No. 12, Dec. 1983, pp. 2175-2184, XP002686570.

* cited by examiner

*Primary Examiner* — Silvana C Runyan
(74) *Attorney, Agent, or Firm* — LORENZ & KOPF, LLP

(57) ABSTRACT

A process for treating a subterranean earth formation includes the step of introducing an acidizing treatment fluid comprising a monovalent salt of monochloroacetic acid into the subterranean earth formation in the presence of at least one bromide or iodide salt or salt precursor, wherein the at least one bromide or iodide salt or salt precursor is introduced into the subterranean earth formation in an amount of from about 0.3 to about 10 wt %, based on the total weight of the acidizing treatment fluid. The acidizing treatment fluid itself includes the monovalent salt of monochloroacetic acid, the at least one bromide or iodide salt or salt precursor, and optionally an element to suppress precipitation of calcium glycolate and/or at least one acid.

18 Claims, 1 Drawing Sheet

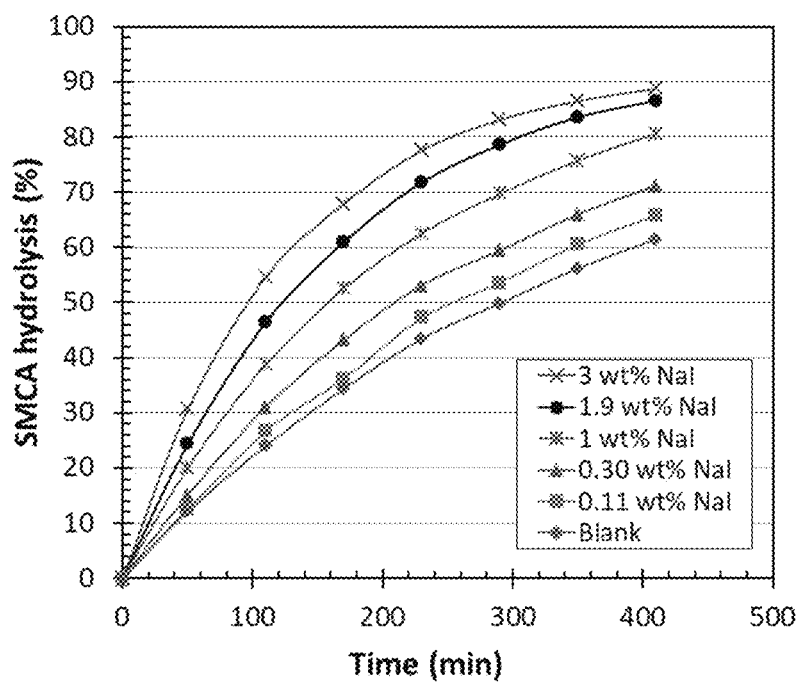

ACIDIZING TREATMENT FLUID FOR DELAYED ACIDIFICATION IN THE OIL FIELD INDUSTRY

CROSS-REFERENCE TO RELATED APPLICATIONS

This application is a U.S. National-Stage entry under 35 U.S.C. § 371 based on International Application No. PCT/EP2021/063291, filed May 19, 2021 which was published under PCT Article 21(2) and which claims priority to European Application No. 20175675.6, filed May 20, 2020, European Application No. 20175679.8, filed May 20, 2020 and European Application No. 20181769.9, filed Jun. 23, 2020, which are all hereby incorporated in their entirety by reference.

TECHNICAL FIELD

The present disclosure is directed to a process for treating a subterranean earth formation and an aqueous acidizing treatment fluid therefor.

BACKGROUND

Acidification fluids are commonly used in the oil industry to create wormholes to connect the wellbore with the formation. Typically, 15-28% hydrochloric acid (HCl) has been used but it has a disadvantage related to its high reactivity with the calcium carbonate ($CaCO_3$) present in limestone reservoirs. This high reactivity usually prevents deep penetration into the formation because, inter alia, the HCl can be introduced only a certain distance before it becomes spent. In addition, because the HCl reacts quickly with $CaCO_3$, wormholes are often formed with unstable structures, which then collapse and block further access to the formation.

There is a continued need to achieve deeper penetration into reservoirs. Accordingly, it is of interest to find an alternative option to the HCl, which is not as reactive, and which offers an acidification feature that can be released in a controlled fashion.

To this end, several patent publications have issued concerning delayed acidification using the hydrolyzation of chlorocarboxylic acid salts. During the hydrolyzation glycolic acid is formed.

U.S. Pat. No. 3,885,630, for example, is directed to a method wherein acid-reactive material in or around a bore hole or well is acidized by contacting water-soluble weak acid and water-soluble weak acid salt such as acetic acid and sodium acetate.

In addition, U.S. Pat. No. 4,122,896 is directed to a method wherein subterranean reservoirs are acidized by injecting a substantially acid-free aqueous solution of a chlorocarboxylic acid salt, such as mono or di-chloroacetic acid salt or 2-chloropropionic acid salt, into the reservoir.

More recently, WO 2020/002011 A1 has provided a process for treating a subterranean earth formation by introducing a monovalent salt of monochloroacetic acid into said subterranean earth formation in the presence of a chelating agent which comprises at least one carboxylate group having a monovalent counterion and furthermore comprises a carbon chain carrying at least five hydroxyl groups.

We have found however, that below temperatures of about 90 or 100° C. the hydrolyzation of chlorocarboxylic acid salts proceeds very slowly. This slow hydrolysis limits the rate at which glycolic acid is formed and can prevent the acid from getting to the portion of the subterranean formation in which it is needed. In addition, in certain acidizing operations, it has been found that the chlorocarboxylic acid salt-based acidizing treatment fluid is not fully spent within the subterranean formation before being pumped back above ground level.

Thus, there is a need to improve delayed acidification treatment fluids containing chlorocarboxylic acid salts.

BRIEF SUMMARY

In a first aspect, the present disclosure is directed to a process for treating a subterranean earth formation by introducing an acidizing treatment fluid comprising a monovalent salt of monochloroacetic acid into said subterranean earth formation in the presence of at least one bromide or iodide salt or salt precursor, wherein the at least one bromide or iodide salt or salt precursor is introduced into the subterranean earth formation in an amount of from about 0.3 to about 10 wt %, based on the total weight of the acidizing treatment fluid.

Preferably, the at least one bromide or iodide salt or salt precursor is a bromide or iodide salt. The bromide or iodide salt may have a cation selected from sodium, potassium, lithium, ammonium, tetraalkylammonium, trialkylamine or iron. Preferably, the bromide or iodide salt is selected from potassium bromide, potassium iodide, sodium bromide and sodium iodide.

The at least one bromide or iodide salt or salt precursor may be present in the acidizing treatment fluid that is introduced into the subterranean earth formation in an amount of from about 0.3 to about 10 wt %, based on the total weight of the acidizing treatment fluid. However, it is also possible to introduce the at least one bromide or iodide salt or salt precursor into the subterranean earth formation prior to the introduction of an acidizing treatment fluid comprising a monovalent salt of monochloroacetic acid and no or less than 0.3 wt %, preferably less than 0.25 wt % of at least one bromide or iodide salt or salt precursor (based on the total weight of the acidizing treatment fluid).

The monovalent salt of monochloroacetic acid may be present in the acidizing treatment fluid that is introduced into the subterranean earth formation in an amount of from about 3 to about 20 wt %, based on the total weight of the acidizing treatment fluid.

In one embodiment, an element to suppress precipitation of calcium glycolate is also introduced into the subterranean earth formation. The element to suppress precipitation of calcium glycolate may be present in the acidizing treatment fluid that is introduced into the subterranean earth formation in an amount of from about 0.005 to about 40 wt %, based on the total weight of the acidizing treatment fluid. However, it is also possible to introduce the element to suppress precipitation of calcium glycolate into the subterranean earth formation prior to the introduction of an acidizing treatment fluid comprising a monovalent salt of monochloroacetic acid and no or less than 0.005 wt %, preferably less than 0.0025 wt % of the element to suppress precipitation of calcium glycolate (based on the total weight of the acidizing treatment fluid). The element to suppress precipitation of calcium glycolate may be a scale inhibitor or a chelating agent.

A preferred element to suppress precipitation of calcium glycolate is a chelating agent, more preferably, a chelating agent comprising at least one monovalent carboxylate salt group and furthermore comprises a carbon chain carrying at least five hydroxyl groups. Particularly preferred is a chelating agent comprising sodium gluconate.

Another preferred element to suppress precipitation of calcium glycolate is a scale inhibitor, more preferably, a scale inhibitor comprising a homopolymer of maleic acid or acrylic acid or a copolymer of maleic acid and acrylic acid, having a total number of carboxyl groups between 5 and 200, or a salt thereof, wherein the homopolymer or copolymer optionally contains one or more phosphonic or sulfonic functional groups, and wherein total number of carboxyl groups is calculated from the weight average molecular weight of the homopolymer or copolymer as determined by size exclusion chromatography relative to polymethacrylic acid standards.

The acidizing treatment fluid may be a buffered acidizing treatment fluid comprising a monovalent salt of monochloroacetic acid and at least one acid, wherein the pH of the buffered acidizing treatment fluid is from about 1.2 to about 5, preferably from about 2 to about 4.6.

The at least one acid may be an inorganic or organic acid with a pKa value of about 5 or lower. Preferably, the at least one acid is present in the buffered acidizing treatment fluid in an amount of from about 0.2 to about 25 wt %, based on the total weight of the buffered acidizing treatment fluid.

The present disclosure is further directed to aqueous acidizing treatment fluid comprising
 (i) a monovalent salt of monochloroacetic acid;
 (ii) at least one bromide or iodide salt or salt precursor; and
 (iii) optionally, an element to suppress precipitation of calcium glycolate and/or at least one acid,
 wherein the at least one bromide or iodide salt or salt precursor is present in the acidizing treatment fluid in an amount of from about 0.3 to about 10 wt %, based on the total weight of the acidizing treatment fluid.

The monovalent salt of monochloroacetic acid may be present in the aqueous acidizing treatment fluid in an amount of from about 3 to about 20 wt %, the element to suppress precipitation of calcium glycolate, when included, may be present in an amount of from about 0.005 to about 40 wt %, and the at least one acid, when included, may be present in an amount of from about 0.2 to about 25 wt %, wherein all amounts are based on the total weight of the acidizing treatment fluid.

BRIEF DESCRIPTION OF THE DRAWINGS

The present disclosure will hereinafter be described in conjunction with the following drawing FIGURES, wherein like numerals denote like elements, and:

FIG. 1 is a plot of the hydrolysis experiments of Example 2.

DETAILED DESCRIPTION

The following detailed description is merely exemplary in nature and is not intended to limit the disclosure or the application and uses of the subject matter as described herein. Furthermore, there is no intention to be bound by any theory presented in the preceding background or the following detailed description. It is to be appreciated that all numerical values as provided herein, save for the actual examples, are approximate values with endpoints or particular values intended to be read as "about" or "approximately" the value as recited.

The various aspects of the present disclosure will be elucidated further below.

As indicated above, the present disclosure is directed to a process for treating a subterranean earth formation by introducing an acidizing treatment fluid comprising a monovalent salt of monochloroacetic acid into said subterranean earth formation in the presence of at least one bromide or iodide salt or salt precursor, wherein the at least one bromide or iodide salt or salt precursor is introduced into the subterranean earth formation in an amount of from about 0.3 to about 10 wt %, based on the total weight of the acidizing treatment fluid.

The addition of from about 0.3 to about 10 wt %, based on the total weight of the acidizing treatment fluid, of at least one bromide or iodide salt or salt precursor, which reacts or hydrolyses in water to provide bromide or iodide ions, has been found to accelerate the hydrolysis of the monovalent salt of monochloroacetic acid at temperatures below 100° C. This increases the rate at which glycolic acid is formed, making more of the acid available down-well even when the earth formation is at a lower temperature (i.e., at or below 90 or 100° C.). Thus, the present disclosure provides a more controlled, and thus improved, delayed acidification treatment fluid containing chlorocarboxylic acid salts.

Put another way, the present disclosure is directed to the use of at least one bromide or iodide salt or salt precursor as an accelerator for a delayed acidizing treatment fluid comprising a monovalent salt of monochloroacetic acid for treating a subterranean earth formation, wherein the at least one bromide or iodide salt or salt precursor is introduced into the subterranean earth formation in an amount of from about 0.3 to about 10 wt %, based on the total weight of the acidizing treatment fluid. As explained above, such use has been found to accelerate the hydrolysis of the monovalent salt of monochloroacetic acid at temperatures below 100° C.

In the present disclosure, a monovalent salt of monochloroacetic acid is used. "Monovalent salt of monochloroacetic acid" means that the cation in the monochloroacetate salt has a valency of one. The cation of the monovalent salt of monochloroacetic acid can be sodium, ammonium, lithium or potassium. Depending on the type of rock formation to be treated, the preferred cation of the salt can be chosen for the monochloroacetic acid salt. In the case of carbonate-based rock, the cation of the monochloroacetic acid salt is preferably sodium, potassium and/or lithium. In the case of sandstone, ammonium is the preferred cation. The cation of the salt of monochloroacetic acid is most preferably sodium (the sodium salt of monochloroacetic acid is hereinafter also denoted as SMCA).

The monovalent salt of monochloroacetic acid is preferably present in the acidizing treatment fluid in an amount of at least 3 wt %, preferably at least 5 wt % and most preferably at least 10 wt %, based on the total weight of the acidizing treatment fluid. The optimal amount of monovalent salt of monochloroacetic acid present in the acidizing treatment fluid ranges from about 3 to about 20 wt %, preferably from about 5 to about 18 wt %, more preferably from about 8 to about 16 wt %, and most preferably from about 10 to about 15 wt %, based on the total weight of the acidizing treatment fluid.

In addition to a monovalent salt of monochloroacetic acid, the acidizing treatment fluid may comprise glycolic acid. Preferably, the acidizing treatment fluid according to the present disclosure comprises a monovalent salt of monochloroacetic acid and less than 1 wt %, more preferably less than 0.1 wt % and most preferably no glycolic acid.

In the present disclosure, at least one bromide or iodide salt or salt precursor is used. The term "bromide or iodide salt precursor" is used herein to mean any substance that reacts or hydrolyses in water to provide bromide or iodide ions. Suitable bromide or iodide salt precursors include, for example, sodium monobromoacetate and sodium monoiodoacetate.

When a bromide or iodide salt is used, the salt preferably has a cation selected from sodium, potassium, lithium, ammonium, tetraalkylammonium, trialkylamine or iron. Preferably, the bromide or iodide salt is potassium bromide, potassium iodide, sodium bromide or sodium iodide.

The at least one bromide or iodide salt or salt precursor may be present in the acidizing treatment fluid that is introduced into the subterranean earth formation in an amount of from about 0.3 to about 10 wt %, preferably from about 0.4 to about 10 wt %, more preferably from about 0.42 to about 9 wt %, more preferably from about 0.5 to about 7 wt %, more preferably from about 0.6 to about 6 wt %, more preferably from about 0.7 to about 5 wt %, and most preferably from about 0.8 to about 3 wt %, based on the total weight of the acidizing treatment fluid. However, it is also possible to introduce the at least one bromide or iodide salt or salt precursor into the subterranean earth formation prior to the introduction of an acidizing treatment fluid comprising a monovalent salt of monochloroacetic acid and no or less than 0.3 wt %, preferably less than 0.25 wt % of at least one bromide or iodide salt or salt precursor (based on the total weight of the acidizing treatment fluid). If the at least one bromide or iodide salt or salt precursor is introduced separate from an acidizing treatment fluid comprising a monovalent salt of monochloroacetic acid, preferably, the at least one bromide or iodide salt or salt precursor is used in an amount of between 0.3 and 13 wt %, preferably between 0.4 and 13 wt %, more preferably between 0.42 and 10 wt %, more preferably between 0.5 and 9 wt %, more preferably between 0.6 wt % and 7 wt %, and most preferably between 0.8 and 5 wt %, based on the total weight of the aqueous acidizing treatment fluid.

As indicated by the expression "at least one bromide or iodide salt or salt precursor", the acidizing treatment fluid may be introduced into the subterranean earth formation in the presence of one or more different bromide salts, one or more different bromide salt precursors, one or more different iodide salts and/or one or more different iodide salt precursors. However, when more than one salt or salt precursor is used, at least one bromide or iodide salt or salt precursor is introduced into the subterranean earth formation in an amount of from about 0.3 to about 10 wt %.

The temperature of the subterranean earth formation into which the acidizing treatment fluid is introduced is preferably at least 60° C., more preferably at least 70° C. The temperature of the earth formation preferably does not exceed 140° C., more preferably it does not exceed 120° C., and most preferably it does not exceed 100° C.

Preferably, the acidizing treatment fluid comprises at least one element to suppress precipitation of calcium glycolate. However, it is also possible to introduce a calcium glycolate precipitation suppression element into the subterranean earth formation prior to the introduction of a treatment fluid comprising a monovalent salt of monochloroacetic acid. An "element to suppress precipitation of calcium glycolate" includes a chelating agent and a scaling inhibitor.

Precipitation of calcium glycolate can occur during acidification as a result of glycolic acid reacting with the $CaCO_3$ present in limestone reservoirs. The product, calcium glycolate has low solubility (the maximum solubility of calcium glycolate is 1.4 wt % at 25° C. and 3.04 wt % at 40° C.) and precipitates easily. Precipitation of calcium glycolate during acidification in the oil wells (also referred to as scaling) is undesirable and can lead to plugging in the confinements, such as piping. In addition, it has been found that calcium glycolate in solution forms a gel upon cooling to room temperature, which can cause plugging as the acidification fluid is pumped back above ground level during extraction and/or while it is later stored. With the addition of a chelating agent and/or a scaling inhibitor as described below, the precipitation of calcium glycolate is inhibited, so that scaling and plugging may be avoided.

Suitable chelating agents comprise any compound capable of chelating calcium glycolate. The chelating agent may be an organic or an inorganic chelant. In some embodiments, the chelating agent comprises compounds that are monodentate, bidentate, tridentate, tetradentate, pentadentate, hexadentate, septadentate, octadentate, or a combination thereof.

Exemplary chelating agents include lactic acid, malonic acid, fumaric acid, citric acid, tartaric acid, glutamic acid diacetic acid (GLDA), methylglycine diacetic acid (MGDA), 1,1,4,4-butanetetracarboxylic acid, 1,2,3,4-butanetetracarboxylic acid, 4,5-imidazoledicarboxylic acid, phosphonic acid, 3-chloropropyl phosphonic acid, aminotris (methylene phosphonic acid) (ATMP), bis(hexamethylentetriaminepenta(methylene phosphonic acid) (BHMTPMPA), 1,2-cyclohexanediaminetetraacetic acid (CDTA), 1,4,7,10-tetraazacyclododecane-1,4,7,10-tetraacetic acid (DOTA), 1,4,7,10-tetraazacyclodedecane-1,4,7,10-tetraphosphonic acid (DOTP), diethylenetriamineepentaacetic acid (DTPA), diethylenetriaminepenta (methylene phosphonic acid) (DTPMP), ethanol-diglycinic acid (EDG), ethylenediamineteraacetic acid (EDTA), ethylene diamine tetra (methylene phosphonic acid) (EDTMPA), ethylenedioxybis(ethyliminodi(acetic acid)) (EGTA), hydroxyaminocarboxylic acid (HACA), 1-hydroxyethane 1,1-diphosphonic acid (HEDP), N-hydroxyethyl-ethylenediaminetriacetic acid (HEDTA), hydroxyethyleneiminodiacetate (HEIDA), N"-carboxymethyldiethylenetriamine-N,N,N',N"-tetraacetate (HDTPA), iminodiacetic acid (IDA), N,N'-bis(carboxymethyl)glycine (NTA), nitrolotripropionic acid (NTP), nitrilotrimethylenephosphonic acid (NTMP), sodium hexametaphosphate (SHMP), triethylenetetramine-N,N,N',N",N"',N""-hexaacetic acid (and N,N'-bis(butanamide) derivative) (TTHA), terpyridine, bypyridiene, triethylenetetramine, biethylenetriamine, bis (hexamethylenetriamine) (BHMT) and salts, derivatives and mixtures thereof.

A preferred chelating agent comprises at least one monovalent carboxylate salt group and furthermore comprises a carbon chain carrying at least five hydroxyl groups. The term "hydroxyl group" is used herein to refer to a functional group including a hydrogen atom covalently bonded to an oxygen atom (denoted as —OH). The term "hydroxyl group" as used herein, does not include the —OH moiety of a carboxyl group. The term "carboxyl" is used herein to refer to a carboxyl group in acid form (denoted as —COOH) or in neutral form (denoted as —COO$^-$X$^+$).

The number of carboxylate groups of the chelating agent n is preferably between 1 and 5. Preferred chelating agents are selected from the group including monovalent salts of glucaric acid, monovalent salts of gluconic acid, monovalent salts of glucoheptonic acid and other stereoisomers of 2,3,4,5,6-pentahydroxyhexanoic acid and 2,3,4,5,6,7-hexahydroxyheptanoic acid. Specific examples are sodium gluconate, sodium glucoheptonate, other stereoisomers of sodium 2,3,4,5,6-pentahydroxyhexanoate and sodium 2,3,4,5,6,7-hexahydroxyheptanoate. Most preferred is the use of sodium gluconate as chelating agent.

Preferably, more than 2 wt % of chelating agent is present in the acidizing treatment solution. Preferably, the molar ratio between the monovalent salt of monochloroacetic acid and the chelating agent lies between 1:0.5/n and 1:10/n, n being the number of carboxylate groups of the chelating agent. Preferably, no more than 40 wt %, and preferably no more than 30 wt % of chelating agent is present in the acidizing treatment solution, based on the total weight of the acidizing treatment solution. The optimal amount of chelating agent present in the acidizing treatment fluid ranges from about 2 to about 30 wt %, preferably from about 5 to about 29 wt %, more preferably from about 7 to about 28 wt %, and most preferably from about 8 to about 28 wt %, based on the total weight of the acidizing treatment fluid.

The amount of said chelating agent used may be less than equimolar to the concentration of monochloroacetate salt in the acidizing treatment fluid introduced. Normally, chelating agent would have to be added in equimolar amounts of the monochloroacetate salt added.

Suitable scaling inhibitors include any compound that inhibits the formation of calcium glycolate scales. Exemplary scaling inhibitors include polyacrylic acids, sulfonated polyacrylic acids, sulfonated polycarboxylates, maleic copolymers, phosphoric polycarboxylic acids, sulfonated styrene/maleic acid copolymer and phosphonates.

A preferred scaling inhibitor comprises a homopolymer of maleic acid or acrylic acid or a copolymer of maleic acid and acrylic acid, having a total number of carboxyl groups between 5 and 200, or a salt thereof, wherein the homopolymer or copolymer optionally contains one or more phosphonic or sulfonic functional groups, and wherein total number of carboxyl groups is calculated from the weight average molecular weight of the homopolymer or copolymer as determined by size exclusion chromatography relative to polymethacrylic acid standards. Preferably, the scaling inhibitor has a total number of carboxyl groups between 7 and 100, and more preferably between 10 and 90.

The term "homopolymer" is used herein to refer to a polymer that is derived from one species of monomer, i.e., maleic acid or acrylic acid, but which may also contain one or more phosphonic or sulfonic functional groups. Likewise, the term "copolymer" is used herein to refer to a polymer derived from more than one species of monomer, i.e., maleic acid and acrylic acid, but which may also contain one or more phosphonic or sulfonic functional groups. When the homopolymer or copolymer contains phosphonic or sulfonic functional groups, these functional groups are preferably present in an amount of from 1 to 5 functional groups, preferably from 1 to 3 functional groups, and more preferably 1 or 2 functional groups per average homopolymer/copolymer. The scaling inhibitor may contain no phosphonic or sulfonic functional groups.

The presence (or absence) of phosphonic or sulfonic functional groups can be determined by $^1H$, $^{13}C$ and $^{31}P$-NMR analysis. For example, using a proton resonance frequency of 600 MHz, a carbon resonance frequency of 150 MHz and a phosphorous resonance frequency of 243 MHz. The sample spectrum can be quantified by calibration with a known molar concentration of NMR standard, and the number of phosphonic groups present per average homopolymer or copolymer chain can be calculated from the results. In the case of sulfonic groups, NMR alone will only provide a qualitative picture, i.e., the structure of the organic surround can be revealed. In order to quantify the number of sulfonic groups present per average homopolymer or copolymer, an additional technique, such as Inductive Couple Plasma techniques (e.g. ICP-MS), is required.

Suitable examples of such scaling inhibitors are the commercially available scale inhibitors Dequest P9000 (supplied by Italmatch Chemicals), Drewsperse 747A (supplied by Solenis), Belclene 200, Belclene 245, Belclene 283 and Belclene 499 (supplied by BWA Water Additives), Sokalan PA30, Sokalan 12S and Sokalan 20PN (supplied by BASF) and Acumer 1050 (supplied by Dow).

The amount of scaling inhibitor used may be kept relatively low so as to avoid cost increases and limit environmental burden. The amount of the scale inhibitor in the acidizing treatment fluid that is introduced into the subterranean earth formation lies preferably between about 0.005 and about 7.5 wt %, more preferably about 0.05 and about 5 wt %, and most preferably between about 0.4 and about 2 wt %, based on the total weight of the acidizing treatment fluid. If the scale inhibitor is introduced separate from a acidizing treatment fluid comprising a monovalent salt of monochloroacetic acid, preferably, the scale inhibitor is used in an amount of between 0.005 and 10 wt %, preferably between 0.05 and 7.5 wt %, and most preferably between 0.4 wt % and 5 wt %, based on the total weight of the acidizing treatment fluid. The amount of scaling inhibitor specified herein refers to the active content of the scaling inhibitor. Thus, if 1 wt % of a scale inhibitor solution with 50% active content is added to the acidizing treatment fluid, the amount of scaling inhibitor present in the fluid, according to the present disclosure, is 0.5 wt %.

Preferably, both a scaling inhibitor and a chelating agent are used. It has been found that with the use of a scaling inhibitor, lower amounts of chelating agent could be used, and vice versa, further lowering the costs and environmental burden.

The acidizing treatment fluid may further comprise at least one acid. When the acidizing treatment fluid comprises at least one acid, the pH of the acidizing treatment fluid is preferably from about 1.2 to about 5, more preferably from about 2 to about 4.6.

The inclusion of at least one acid has been found to result in buffered acidizing treatment fluids that provide delayed acidification fluids with increased calcium carbonate dissolution capacity. The term "buffered acidizing treatment fluid" is used herein to refer to an aqueous solution, comprising a monovalent salt of monochloroacetic acid and at least one acid, which resists changes in pH when limited amounts of acid or base are added to it. By appropriate combinations of the monovalent salt of monochloroacetic acid and the at least one acid, a buffered acidizing treatment fluid can be obtained whose pH is between about 1.2 to about 5, preferably between about 2 to about 4.6. Such solutions have been found to be effective delayed acidification fluids, without suffering the drawbacks of using either the acid or the chlorocarboxylic acid salts alone.

The at least one acid may be an inorganic or organic acid with a pKa value of about 5 or lower, preferably from about −10 to about 5, more preferably from about −7 to about 5. In particular, the at least one acid may be selected from hydrochloric acid, chloric acid ($HClO_3$), hydrobromic acid (HBr), hydrofluoric acid (HF), sulfuric acid ($H_2SO_4$), nitric acid ($HNO_3$), perchloric acid ($HClO_4$), hydroiodic acid (HI), phosphoric acid ($H_3PO_4$), formic acid, acetic acid, methanesulfonic acid (MSA), p-toluenesulfonic acid, or any combination thereof. Preferably, the at least one acid is selected from hydrochloric acid, formic acid, acetic acid, methanesulfonic acid (MSA), p-toluenesulfonic acid, or any combination thereof. Preferably, the at least one acid is not monochloroacetic acid.

The at least one acid is preferably present in the buffered acidizing treatment fluid in an amount of from about 0.2 to about 25 wt %, preferably from about 0.5 to about 20 wt %, more preferably from about 0.8 to about 15 wt %, and most preferably from about 1 to about 12 wt %, based on the total weight of the buffered acidizing treatment fluid.

When the acid is a strong acid, that is, an acid that completely dissociates in aqueous solution (Ka>1, pKa<1), e.g., hydrochloric acid, the buffered acidizing treatment fluid preferably contains from about 0.2 to about 8 wt % acid, more preferably from about 0.4 to about 6 wt % acid, more preferably from about 0.6 to about 5.5 wt % acid, and most preferably from about 1 to about 5 wt % acid. When the acid is a weak acid, that is, an acid that does not completely dissociate in aqueous solution (Ka<1, pKa>1), e.g., acetic acid, the buffered acidizing treatment fluid preferably contains from about 0.2 to about 25 wt % acid, preferably from about 0.8 to about 20 wt % acid, more preferably from about 1.5 to about 15 wt % acid, and most preferably from about 2 to about 12 wt % acid.

Preferably, the at least one acid is hydrochloric acid or acetic acid. It is believed that the buffer capacity of the monochloroacetic acid salt solution reduces the degree of dissociation of the added acid. This tempers the reactivity of the acid, thereby allowing HCl to be used down-well without suffering the known drawbacks, such as face dissolution at the injection site.

When the acid is hydrochloric acid, the buffered acidizing treatment fluid preferably contains from about 3 to about 20 wt % monovalent salt of monochloroacetic acid and from about 0.2 to about 8 wt % hydrochloric acid, more preferably from about 5 to about 18 wt % monovalent salt of monochloroacetic acid and from about 0.4 to about 6 wt % hydrochloric acid, more preferably from about 8 to about 16 wt % monovalent salt of monochloroacetic acid and from about 0.6 to about 5.5 wt % hydrochloric acid, and most preferably from about 10 to about 15 wt % monovalent salt of monochloroacetic acid and from about 1 to about 5 wt % hydrochloric acid, based on the total weight of the buffered acidizing treatment fluid.

When the acid is acetic acid, the buffered acidizing treatment fluid preferably contains from about 3 to about 20 wt % monovalent salt of monochloroacetic acid and from about 0.2 to about 25 wt % acetic acid, more preferably from about 5 to about 18 wt % monovalent salt of monochloroacetic acid and from about 0.8 to about 20 wt % acetic acid, more preferably from about 8 to about 16 wt % monovalent salt of monochloroacetic acid and from about 1.5 to about 15 wt % acetic acid, and most preferably from about 10 to about 15 wt % monovalent salt of monochloroacetic acid and from about 2 to about 12 wt % acetic acid, based on the total weight of the buffered acidizing treatment fluid.

The present disclosure is further directed to an aqueous acidizing treatment fluid comprising
  (i) a monovalent salt of monochloroacetic acid;
  (ii) at least one bromide or iodide salt or salt precursor; and
  (iii) optionally, an element to suppress precipitation of calcium glycolate and/or at least one acid,
  wherein the at least one bromide or iodide salt or salt precursor is present in the acidizing treatment fluid in an amount of from about 0.3 to about 10 wt %, based on the total weight of the acidizing treatment fluid.

As set out above, the aqueous acidizing treatment fluid of the present disclosure may contain from about 3 to about 20 wt % monovalent salt of monochloroacetic acid and from about 0.3 to about 10 wt % of at least one bromide or iodide salt or salt precursor, preferably from about 5 to about 18 wt % monovalent salt of monochloroacetic acid and from about 0.4 to about 10 wt % of at least one bromide or iodide salt or salt precursor, more preferably from about 5 to about 18 wt % monovalent salt of monochloroacetic acid and from about 0.42 to about 9 wt % of at least one bromide or iodide salt or salt precursor, more preferably from about 5 to about 18 wt % monovalent salt of monochloroacetic acid and from about 0.5 to about 7 wt % of at least one bromide or iodide salt or salt precursor, more preferably from about 8 to about 16 wt % monovalent salt of monochloroacetic acid and from about 0.6 to about 6 wt % of at least one bromide or iodide salt or salt precursor, more preferably from about 8 to about 16 wt % monovalent salt of monochloroacetic acid and from about 0.7 to about 5 wt % of at least one bromide or iodide salt or salt precursor, and most preferably from about 10 to about 15 wt % monovalent salt of monochloroacetic acid and from about 0.8 to about 3 wt % of at least one bromide or iodide salt or salt precursor, based on the total weight of the buffered acidizing treatment fluid.

The aqueous acidizing treatment fluid may be prepared by mixing components (i)-(iii) at the location of the well in which the fluid is to be used. Alternatively, the components may be mixed off-site and transported to the location at which they will be used. If mixed off-site, one should be mindful of the temperature at which the fluid is kept. Preferably, the fluid should be kept at temperature below which hydrolysis may occur (e.g., 50° C. or less). The monovalent salt of monochloroacetic acid can also be prepared on-site, by mixing monochloroacetic acid with a monovalent base, such as sodium hydroxide or ammonium hydroxide.

The acidizing treatment fluid may further comprise one or more compounds selected from the group of mutual solvents, anti-sludge agents, (water-wetting or emulsifying) surfactants, corrosion inhibitors, corrosion inhibitors intensifiers, foaming agents, wetting agents, diverting agents, oxygen scavengers, carrier fluids, fluid loss additives, friction reducers, stabilizers, rheology modifiers, breakers, salts, brines, pH control additives such as further acids and/or bases, bactericides/biocides, particulates, crosslinkers, salt substitutes (such as tetramethyl ammonium chloride), relative permeability modifiers, sulfide scavengers, fibres, nanoparticles, combinations thereof, or the like.

A mutual solvent is a chemical additive that is soluble in oil, water, acids (often HCl based), and other well treatment fluids. Mutual solvents are routinely used in a range of applications, controlling the wettability of contact surfaces before, during and/or after a treatment, and preventing or breaking emulsions. Suitable mutual solvents are ketones, alcohols or esters.

The surfactant can be any surfactant known to the person skilled in the art for use in oil and gas wells. Preferably, the surfactant is a nonionic, amphoteric, anionic or cationic surfactant, even more preferably a cationic surfactant.

Anti-sludge agents stabilize the acid-oil emulsion and include alkyl phenols, fatty acids, and anionic surfactants. Frequently used as the surfactant is a blend of a sulfonic acid derivative and a dispersing surfactant in a solvent. Such a blend generally has dodecyl benzene sulfonic acid (DDBSA) or a salt thereof as the major dispersant, i.e. anti-sludge, component.

Corrosion inhibitors may be selected from the group of amine and quaternary ammonium compounds and sulfur compounds. Examples are diethyl thiourea (DETU), which is suitable up to 185° F. (about 85° C.), alkyl pyridinium or quinolinium salt, such as dodecyl pyridinium bromide (DDPB), and sulfur compounds, such as thiourea or ammonium thiocyanate, which are suitable for the range 203-302° F. (about 95-150° C.), benzotriazole (BZT), benzimidazole (BZI), dibutyl thiourea, a proprietary inhibitor called TIA, and alkyl pyridines.

One or more corrosion inhibitor intensifiers may be added, such as for example formic acid, potassium iodide, antimony chloride, or copper iodide.

In general, the most successful inhibitor formulations for organic acids and chelating agents contain amines, reduced sulfur compounds or combinations of a nitrogen compound (amines, quats or polyfunctional compounds) and a sulfur compound. The amount of corrosion inhibitor is preferably between 0.1 and 2.0 volume % on total fluid.

Wetting agents that may be suitable for use in this present disclosure include crude tall oil, oxidized crude tall oil, surfactants, organic phosphate esters, modified imidazolines and amidoamines, alkyl aromatic sulfates and sulfonates, and the like, and combinations or derivatives of these and similar such compounds that should be well known to one of skill in the art.

One or more salts may be used as rheology modifiers to modify the rheological properties (e.g., viscosity and elastic properties) of the treatment fluids. These salts may be organic or inorganic. When adding salts care should be taken not to detrimentally affect the pH and therewith detrimentally affect the hydrolyzation rate.

Alternative rheology modifiers may include organic or inorganic gelling agents and/or viscosifiers. Examples of commonly used rheology modifiers include, but are not limited to, biopolymers, polysaccharides such as guar gums, xanthan gum, and derivatives thereof, cellulose derivatives such as hydroxyethyl cellulose (HEC), viscoelastic surfactants, and synthetic polymers and oligomers such as poly (ethylene glycol) [PEG], poly(diallyl amine), poly(acrylamide), poly(aminomethyl propyl sulfonate) [AMPS polymer], poly(acrylonitrile), poly(vinyl acetate), poly(vinyl alcohol), poly(vinyl amine), poly(vinyl sulfonate), poly(styryl sulfonate), poly(acrylate), poly(methyl acrylate), poly(methacrylate), poly(methyl methacrylate), poly(vinyl pyrrolidone), poly(vinyl lactam), and co-, ter-, and quaterpolymers of the following (co-)monomers: ethylene, butadiene, isoprene, styrene, divinyl benzene, divinyl amine, 1,4-pentadiene-3-one (divinyl ketone), 1,6-heptadiene-4-one (diallyl ketone), diallyl amine, ethylene glycol, acrylamide, AMPS, acrylonitrile, vinyl acetate, vinyl alcohol, vinyl amine, vinyl sulfonate, styryl sulfonate, acrylate, methyl acrylate, methacrylate, methyl methacrylate, vinyl pyrrolidone, and vinyl lactam. Yet other rheology modifiers include clay-based viscosifiers, especially laponite and other small fibrous clays such as the polygorskites (attapulgite and sepiolite). When using polymer-containing viscosifiers, the viscosifiers may be used in an amount of up to 5% by weight of the fluid.

The use of brines is known in the art. Any brine chosen should be compatible with the formation and should have a sufficient density to provide the appropriate degree of well control.

Additional salts may be added to a water source, e.g., to provide a brine, and a resulting treatment fluid, in order to have a desired density. The amount of salt to be added should be the amount necessary for formation compatibility, such as the amount necessary for the stability of clay minerals, taking into consideration the crystallization temperature of the brine, e.g., the temperature at which the salt precipitates from the brine as the temperature drops. Preferred suitable brines may include seawater and/or formation brines.

It is noted that various elements of the present disclosure, including but not limited to preferred ranges for the various parameters, can be combined unless they are mutually exclusive.

The present disclosure will be elucidated by the following examples without being limited thereto or thereby.

EXAMPLES

Molecular Weight Measurement

Molecular weights were determined by conventional size exclusion chromatography (SEC) relative to polymethacrylic acid (PMA) standards, with refractive index (RI) and ultraviolet (UV) detectors, under the conditions listed below. The analyses were performed on the samples as received. Solutions were prepared by diluting with the eluent to the desired concentration.

The samples were analyzed using the Wyatt MALS system. Only the RI and UV detector signals were used for data evaluation. The base column used was a PL Aquagel-OH 30 column, unless the molecular size of the sample was too high. In such cases, a TSKgel GMPWx1 column was used instead.

| Parameter | Setting/description |
|---|---|
| Instrument | Agilent 1260 Infinity II |
| Columns | (A) 2× PL Aquagel-OH 30 7.8 × 300 mm + pre column; or |
| | (B) 2× TSKgel GMPWxl |
| MW range | (A) 500-60,000 g/mol |
| | (B) 500-1,000,000 g/mol |
| Mobile Phase | 50 mM Na Acetate; 0.02% m/v Sodium Azide; pH 6 (Acetic acid) |
| Flow | 0.5 mL/min |
| Injection volume | 50 µL |
| Sample concentration | ca. 1.3 mg/mL |
| Column T | 35° C. |
| Filtration | Eluent 0.2 µm RC filter; sample solutions 0.45 µm RC filter |
| Detection UV | Agilent 1260 Infinity VWD, 254 nm |
| Detection Refractive Index | Agilent 1260 Infinity RID |
| Detection Intrinsic Viscosity | WYATT ViscoStar II (signals not used in this study) |
| Detection MALS | WYATT DAWN Heleos-II (signals not used in this study) |
| Conventional calibration parameters | Multipoint calibration line using polymethacrylic acid Na-salt standards with Mw 1250, 3570, 4700, 5840, 6610, 7830, and 22500 g/mol (PSS) |
| Data processing | Astra 7.3.2.19 (Wyatt) |

Example 1: Hydrolysis of SMCA in the Presence of Different Salts

The effect of different salts on the hydrolysis rate of SMCA was investigated. The selected salts were potassium iodide (KI), potassium bromide (KBr), sodium bromide (NaBr), sodium iodide (NaI), ammonium chloride ($NH_4Cl$), lithium nitrate ($LiNO_3$), iron chloride ($FeCl_3$), tetramethylammonium chloride (TMACl), lithium chloride (LiCl), potassium chloride (KCl) and sodium chloride (NaCl).

A solution was made comprising 15-17 wt % SMCA and 25-28 wt % sodium gluconate (NaG) in formation water. The composition of the formation water can be found in Table 1A. The solution was divided between different 40 ml vials and 1 wt % of salt was added.

The vials were placed in an oil bath at 80° C. After 10 minutes (t=0), a first sample was taken to measure the concentration of halogen ions. Free halogen ions were analyzed by a titrimetric method using a Dosimat 805 titrando and 0.1 M silver nitrate reagent solution according to SMA 269.01. The analyses were repeated every hour for a period of 6 hours, from which the extent of SMCA hydrolysis was calculated.

To compare the results of the different salts, the half-life time (t50) of the SMCA concentration was found for each sample and compared to the half-life time of a blank reference sample, without any salt added (t50_blank). The term "half-life time (t50)" is used herein to refer to the time it takes until 50% of the SMCA is converted to glycolic acid.

As can be seen from the results in Table 1B, the presence of at least one bromide or iodide salt significantly accelerated the hydrolysis rate of SMCA at 80° C. Of the salts tested, NaI can be seen to have the largest effect, with the hydrolysis rate for SMCA in the presence of NaI being about 44% faster than in the absence of NaI.

TABLE 1A

Composition of formation water used

| Formation water composition | g/l |
|---|---|
| Mg | 1.0 |
| Ca | 0.48 |
| K | 0.5 |
| Na | 12.1 |
| SO$_4$ | 4.2 |
| CF | 19.9 |
| HCO$_3$ | 0.18 |

TABLE 1B

Results of SMCA hydrolysis tests with NaG and 1 wt % salt at 80° C.

| Salt | Concentration (wt %) | Half-life time (t50) | Acceleration (t50_blank/t50) |
|---|---|---|---|
| None (blank) | — | 245 | — |
| NaI | 1.0 | 145 | 1.7 |
| NaBr | 1.0 | 185 | 1.3 |
| KBr | 1.0 | 170 | 1.4 |
| KI | 1.1 | 172 | 1.4 |
| NH$_4$Cl | 1.0 | 240 | 1.0 |
| LiNO$_3$ | 1.0 | 260 | 0.9 |
| FeCl$_3$ | 1.0 | 270 | 0.9 |
| TMACl | 1.0 | 220 | 1.1 |
| LiCl | 1.0 | 235 | 1.0 |
| KCl | 1.0 | 220 | 1.1 |
| NaCl | 1.0 | 220 | 1.1 |

Example 2: Hydrolysis of SMCA in the Presence of Different Concentrations of NaI In view of the results of Example 1, the effect of the concentration of NaI on the hydrolysis rate of SMCA was investigated.

Hydrolysis experiments similar to those of Example 1 were repeated but now with a formation water solution comprising 15 wt % SMCA and 25 wt % NaG. The solution was divided between different 40 ml vials and NaI was added in different concentrations up to 3.1 wt %. The results are shown in Table 2 and in FIG. 1.

TABLE 2

Results of SMCA hydrolysis tests with NaG and NaI at 80° C.

| Concentration NaI (wt %) | Half-life time (t50) | Acceleration (t50_blank/t50) |
|---|---|---|
| None (blank) | 220 | 1 |
| 0.11 | 218 | 1.01 |
| 0.30 | 170 | 1.3 |
| 1.0 | 125 | 1.8 |
| 1.9 | 100 | 2.2 |
| 3.1 | 78 | 2.8 |

As can be seen from Table 2, the higher the NaI concentration the higher the SMCA hydrolysis rate. The half-life time (t50), i.e., the time to 50% hydrolysis for a SMCA formulation, in the presence of 3.1 wt % NaI is reduced by almost a factor 3 compared to the blank.

Example 3: Hydrolysis of SMCA in the Presence of Different Concentrations of KI

Hydrolysis experiments similar to those of Example 1 were repeated but now with a formation water solution comprising 13 wt % SMCA and 24.3 wt % NaG. The solution was divided between different 40 ml vials and KI was added in different concentrations up to 3.1 wt %. The results are shown in Table 3.

TABLE 3

Results of SMCA hydrolysis tests with NaG and KI at 80° C.

| Concentration KI (wt %) | Half-life time (t50) | Acceleration (t50_blank/t50) |
|---|---|---|
| None (blank) | 270 | 1 |
| 1.1 | 172 | 1.6 |
| 2.0 | 131 | 2.1 |
| 3.1 | 105 | 2.6 |

As can be seen from Table 3, the higher the KI concentration the higher the SMCA hydrolysis rate. The half-life time (t50), i.e., the time to 50% hydrolysis for a SMCA formulation, in the presence of 3.1 wt % KI is reduced by a factor 2.6 compared to the blank.

Example 4: Hydrolysis of SMCA in the Presence of NaBr

Hydrolysis experiments similar to those of Example 1 were repeated but now with a formation water solution comprising 15 wt % SMCA (without NaG chelant). The solution was divided between different 40 ml vials and to one vial 1 wt % NaBr was added. In this case the t30 was measured, that is, the time to reach 30% hydrolysis of SMCA. The addition of NaBr resulted in acceleration (t30_blank/t30) of 1.3.

Whilst the present disclosure has been described with reference to an exemplary embodiment, it will be appreciated that various modifications are possible within the scope of the present disclosure.

In this specification, unless expressly otherwise indicated, the word 'or' is used in the sense of an operator that returns a true value when either or both of the stated conditions is met, as opposed to the operator 'exclusive or' which requires that only one of the conditions is met. The word 'comprising' is used in the sense of 'including' rather than to mean 'consisting of'. All prior teachings acknowledged above are hereby incorporated by reference. No acknowledgement of any prior published document herein should be taken to be an admission or representation that the teaching thereof was common general knowledge in Europe or elsewhere at the date hereof.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

What is claimed is:

1. A process for treating a subterranean earth formation by introducing an acidizing treatment fluid comprising a monovalent salt of monochloroacetic acid into said subterranean earth formation in the presence of at least one iodide salt, wherein the at least one iodide salt is introduced into the subterranean earth formation in an amount of from about 0.3 to about 10 wt%, based on the total weight of the acidizing treatment fluid wherein an element to suppress precipitation of calcium glycolate is also introduced into the subterranean earth formation in an amount of from about 0.005 to about 40 wt%, based on the total weight of the acidizing treatment fluid.

2. The process as claimed in claim 1, wherein the at least one iodide salt has a cation selected from sodium, potassium, lithium, ammonium, trialkylamine, tetraalkylammonium or iron.

3. The process as claimed in claim 1, wherein the monovalent salt of monochloroacetic acid is present in the acidizing treatment fluid in an amount of from about 3 to about 20 wt %, based on the total weight of the acidizing treatment fluid, or wherein the monovalent salt of monochloroacetic acid is the sodium salt of monochloroacetic acid and is present in the acidizing treatment fluid in an amount of from about 3 to about 20 wt %, based on the total weight of the acidizing treatment fluid.

4. The process as claimed in claim 1, wherein the element to suppress precipitation of calcium glycolate is a chelating agent comprising at least one monovalent carboxylate salt group and furthermore comprises a carbon chain carrying at least five hydroxyl groups, and/or a scale inhibitor comprising a homopolymer of maleic acid or acrylic acid or a copolymer of maleic acid and acrylic acid, having a total number of carboxyl groups between about 5 and about 200, or a salt thereof, wherein the homopolymer or copolymer optionally comprises one or more phosphonic or sulfonic functional groups, and wherein total number of carboxyl groups is calculated from the weight average molecular weight of the homopolymer or copolymer as determined by size exclusion chromatography relative to polymethacrylic acid standards.

5. The process as claimed in claim 4, wherein the chelating agent comprises sodium gluconate.

6. The process as claimed in claim 1, wherein the at least one acid is an inorganic or organic acid with a pKa value of about 5 or lower and is present in the buffered acidizing treatment fluid in an amount of from about 0.2 to about 25 wt %, based on the total weight of the buffered acidizing treatment fluid.

7. The process as claimed in claim 1, wherein said step of introducing is further defined as introducing the acidizing treatment fluid comprising a monovalent salt of monochloroacetic acid into said subterranean earth formation in the presence of at least sodium iodide.

8. The process as claimed in claim 7, wherein the sodium iodide is introduced into the subterranean earth formation in an amount of from about 0.3 to about 3.1 wt %, based on the total weight of the acidizing treatment fluid.

9. The process as claimed in claim 1, wherein the at least one iodide salt is introduced into the subterranean earth formation in an amount of from about 0.3 to about 3.1 wt%, based on the total weight of the acidizing treatment fluid.

10. The process as claimed in claim 1, wherein the acidizing treatment fluid is a buffered acidizing treatment fluid comprising the monovalent salt of monochloroacetic acid and at least one acid and having a pH of from about 1.2 to about 5.6.

11. A process for treating a subterranean earth formation by introducing an acidizing treatment fluid comprising a monovalent salt of monochloroacetic acid into said subterranean earth formation in the presence of at least one iodide salt, wherein the at least one iodide salt is introduced into the subterranean earth formation in an amount of from about 0.3 to about 10 wt%, based on the total weight of the acidizing treatment fluid, wherein the acidizing treatment fluid is a buffered acidizing treatment fluid comprising the monovalent salt of monochloroacetic acid and at least one acid and having a pH of from about 1.2 to about 5.6.

12. The process as claimed in claim 11, wherein the at least one iodide salt has a cation selected from sodium, potassium, lithium, ammonium, trialkylamine, tetraalkylammonium or iron.

13. The process as claimed in claim 11, wherein the monovalent salt of monochloroacetic acid is present in the buffered acidizing treatment fluid in an amount of from about 3 to about 20 wt%, based on the total weight of the buffered acidizing treatment fluid, or wherein the monovalent salt of monochloroacetic acid is the sodium salt of monochloroacetic acid and is present in the buffered acidizing treatment fluid in an amount of from about 3 to about 20 wt%, based on the total weight of the buffered acidizing treatment fluid.

14. The process as claimed in claim 11, wherein an element to suppress precipitation of calcium glycolate is also introduced into the subterranean earth formation in an amount of from about 0.005 to about 40 wt%, based on the total weight of the buffered acidizing treatment fluid.

15. The process as claimed in claim 14, wherein the element to suppress precipitation of calcium glycolate is a chelating agent comprising at least one monovalent carboxylate salt group and furthermore comprises a carbon chain carrying at least five hydroxyl groups, and/or a scale inhibitor comprising a homopolymer of maleic acid or acrylic acid or a copolymer of maleic acid and acrylic acid, having a total number of carboxyl groups between about 5 and about 200, or a salt thereof, wherein the homopolymer or copolymer optionally comprises one or more phosphonic or sulfonic functional groups, and wherein total number of carboxyl groups is calculated from the weight average molecular weight of the homopolymer or copolymer as determined by size exclusion chromatography relative to polymethacrylic acid standards.

16. The process as claimed in claim 15, wherein the chelating agent comprises sodium gluconate.

17. The process as claimed in claim 11, wherein the at least one acid is an inorganic or organic acid with a pKa value of about 5 or lower and is present in the buffered acidizing treatment fluid in an amount of from about 0.2 to about 25 wt%, based on the total weight of the buffered acidizing treatment fluid.

18. The process as claimed in claim 11, wherein said step of introducing is further defined as introducing the buffered acidizing treatment fluid comprising a monovalent salt of monochloroacetic acid into said subterranean earth formation in the presence of at least sodium iodide.

* * * * *